(12) United States Patent
Dahl et al.

(10) Patent No.: US 11,518,496 B2
(45) Date of Patent: Dec. 6, 2022

(54) FLAP ACTUATION SYSTEMS FOR AIRCRAFT

(71) Applicant: The Boeing Company, Chicago, IL (US)

(72) Inventors: Bruce Dahl, Kent, WA (US); Kevin Tsai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 678 days.

(21) Appl. No.: 16/552,466

(22) Filed: Aug. 27, 2019

(65) Prior Publication Data

US 2021/0061443 A1 Mar. 4, 2021

(51) Int. Cl.
*B64C 9/04* (2006.01)
*F16H 21/52* (2006.01)
*B64C 9/02* (2006.01)
*B64D 29/02* (2006.01)

(52) U.S. Cl.
CPC .................. *B64C 9/04* (2013.01); *B64C 9/02* (2013.01); *B64D 29/02* (2013.01); *F16H 21/52* (2013.01)

(58) Field of Classification Search
CPC .... B64C 9/02; B64C 7/00; B64C 3/50; B64C 5/08; B64C 9/18; F16H 21/52
See application file for complete search history.

(56) References Cited

U.S. PATENT DOCUMENTS

| 4,605,187 A * | 8/1986 | Stephenson | B64C 9/04 244/216 |
| 4,669,687 A * | 6/1987 | Rudolph | B64C 9/18 244/215 |
| 2017/0158348 A1* | 6/2017 | Teubner | B64C 13/50 |

FOREIGN PATENT DOCUMENTS

WO     2008129074     10/2008

* cited by examiner

*Primary Examiner* — Tien Q Dinh
*Assistant Examiner* — William L Gmoser
(74) *Attorney, Agent, or Firm* — Hanley, Flight & Zimmerman, LLC (57) ABSTRACT

Flap actuation systems for aircraft are described herein. An example flap actuation system includes a fixed beam coupled to and extending downward from a fixed wing portion of an aircraft wing and a rocking lever plate pivotably coupled to the fixed beam. The rocking lever plate is coupled to a forward end of a flap bracket disposed on a bottom side of a flap of the wing. The flap actuation system also includes a crank arm, a crank rod coupled between the crank arm and the rocking lever plate, and a flap link coupled between the rocking lever plate and an aft end of the flap bracket, such that actuation of the crank arm pivots the rocking lever plate to move the flap between a stowed position and a deployed position relative to the fixed wing portion.

20 Claims, 6 Drawing Sheets

FLAP ACTUATION SYSTEMS FOR AIRCRAFT

FIELD OF THE DISCLOSURE

This disclosure relates generally to aircraft and, more particularly, to flap actuation systems for aircraft.

BACKGROUND

Aircraft commonly employ control surfaces (e.g., high lift devices) along the fixed trailing edge of each wing of the aircraft. For example, each wing of the aircraft may include one or more flap(s) that are coupled to the wing, with the flaps being movable relative to the fixed trailing edge of the wing. The flaps may be moved outward and/or tilted downward from the trailing edge of the wing to change the shape of the wing to generate more or less lift. The flaps are often deployed during takeoff and landing, for instance, to generate more lift at lower speeds.

SUMMARY

A flap actuation system disclosed herein includes a fixed beam coupled to and extending downward from a fixed wing portion of a wing of an aircraft and a rocking lever plate pivotably coupled to the fixed beam via a first coupling. The rocking lever plate is coupled to a forward end of a flap bracket disposed on a bottom side of a flap of the wing. The flap actuation system also includes a crank arm and a crank rod coupled between the crank arm and the rocking lever plate. The crank rod is coupled to the rocking lever plate via a second coupling that is spaced apart from the first coupling. The flap actuation system further includes a flap link coupled between the rocking lever plate and an aft end of the flap bracket, such that actuation of the crank arm pivots the rocking lever plate to move the flap between a stowed position and a deployed position relative to the fixed wing portion.

An aircraft wing disclosed herein includes a fixed wing portion, a flap, and a flap actuation system coupled to the fixed wing portion to move the flap relative to the fixed wing portion between a stowed position and a deployed position. The flap actuation system includes a fixed beam coupled to and extending downward from the fixed wing portion and a rocking lever plate pivotably coupled to the fixed beam. The rocking lever plate is coupled to a forward end of a flap bracket disposed on a bottom side of the flap. The rocking lever plate is to be rotated relative to the fixed beam via a rotary actuator. The flap actuation system also includes a flap link coupled between the rocking lever plate and an aft end of the flap bracket. The fixed beam, the rocking lever plate, the flap bracket, and the flap link are oriented generally streamwise.

A flap actuation system disclosed herein includes a fixed beam coupled to and extending downward from a fixed wing portion of a wing of an aircraft and a rocking lever plate pivotably coupled to the fixed beam via a first coupling. The rocking lever plate is coupled to a forward end of a flap bracket disposed on a bottom side of a flap of the wing. The flap actuation system also includes a linear actuator having an output shaft and a connecting arm coupled between the output shaft and the rocking lever plate. The connecting arm is coupled to the rocking lever plate via a second coupling that is spaced apart from the first coupling. The flap actuation system further includes a flap link coupled between the rocking lever plate and an aft end of the flap bracket, such that actuation of the output shaft pivots the rocking lever plate to move the flap between a stowed position and a deployed position relative to the fixed wing portion.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft typically employ one or more high-lift devices (sometimes referred to as auxiliary airfoils) along the leading and/or trailing edges of the wings. Flaps are a common type of high-lift device that are movably mounted along a trailing edge of a wing. A flap, for instance, is movable between a stowed position in which the flap is in line with the wing and a deployed position in which the flap is moved (and/or angled) downward from the trailing edge of the wing. Aircraft may include one or multiple flaps along the trailing edge of a wing. When deployed, the flap(s) change(s) the chord length and camber of the wing, which can be used to generate more or less drag and lift. As such, flaps are typically deployed during takeoff and landing.

Each flap is actuated by one or more flap actuation systems, which are also commonly referred to flap actuation mechanisms or devices. A flap actuation system typically includes an actuator and an assembly of links or structures that extend to move the flap downward to the deployed position and retract to move the flap back to the stowed position. Flap actuation systems are coupled to a structure (e.g., a rear spar, a rib, etc.) of a fixed wing portion of the wing. These flap actuation systems typically project downward from the bottom of the wing and are coupled to the respective flap(s). Many known flap actuation systems are oriented perpendicular to the trailing edge of the wing/flap, which may also be considered to be aligned in a chordwise orientation. As used herein, the term chordwise means aligned with a chord of a wing, which is a line joining the leading and trailing edges of a wing. When actuated, the flap actuation systems move an assembly of links in a direction that is perpendicular to the trailing edge of the wing (e.g., in a chordwise direction) to move the flap toward or away from the fixed portion of the wing. These known flap actuation systems are complex and generally require a large amount of space.

To reduce drag, flap actuation systems are commonly covered by or contained within flap actuation fairings (sometimes referred to as anti-shock bodies, Withcomb bodies, or Kuchemann carrots) on the bottom of the wing. The flap actuation fairings are oriented streamwise. However, most aircraft have swept wings, meaning the wings are angled rearward from the root of the wing at the fuselage rather than being perpendicular to the fuselage. Swept wings typically have better aerodynamic performance than non-swept wings. Therefore, the perpendicular direction (e.g., chordwise direction) in which the flap actuation systems are oriented is angled relative to the streamwise direction. As such, the flap actuation systems are typically angled within (and relative to) their respective flap actuation fairings. As a result, the flap actuation fairings are relatively wide to accommodate the angled orientation of the flap actuation systems. However, wider flap actuation fairings add weight to the aircraft and reduce high speed performance of the aircraft.

Disclosed herein are example flap actuation systems that address the above-noted drawbacks. Example flap actuation systems disclosed herein are less complex and utilize fewer components than known flap actuation systems. Thus, example flap actuation systems disclosed herein are generally lighter and less expensive. Further, the example flap actuation systems disclosed herein are smaller and more compact than known flap actuation systems.

In some examples disclosed herein, the flap actuation systems enable the flap to move at least partially spanwise in a complex motion, referred to as a conical motion. As used herein, the term spanwise means inboard or outboard along the span of an aircraft wing, from the tip to the root. In other words, the example flap actuation systems enable out-of-plane movement of parts of the flap actuation systems. As such, the example flap actuation systems can be oriented streamwise (rather than chordwise) on the wing. As a result, the width of the flap actuation fairings (which are also oriented streamwise) can be significantly reduced. Further, the example flap actuation systems have less total wetted area, which results in reduced profile drag, wave drag, and excrescence drag, which greatly improves high speed performance and fuel efficiency of the aircraft.

Figure 1:
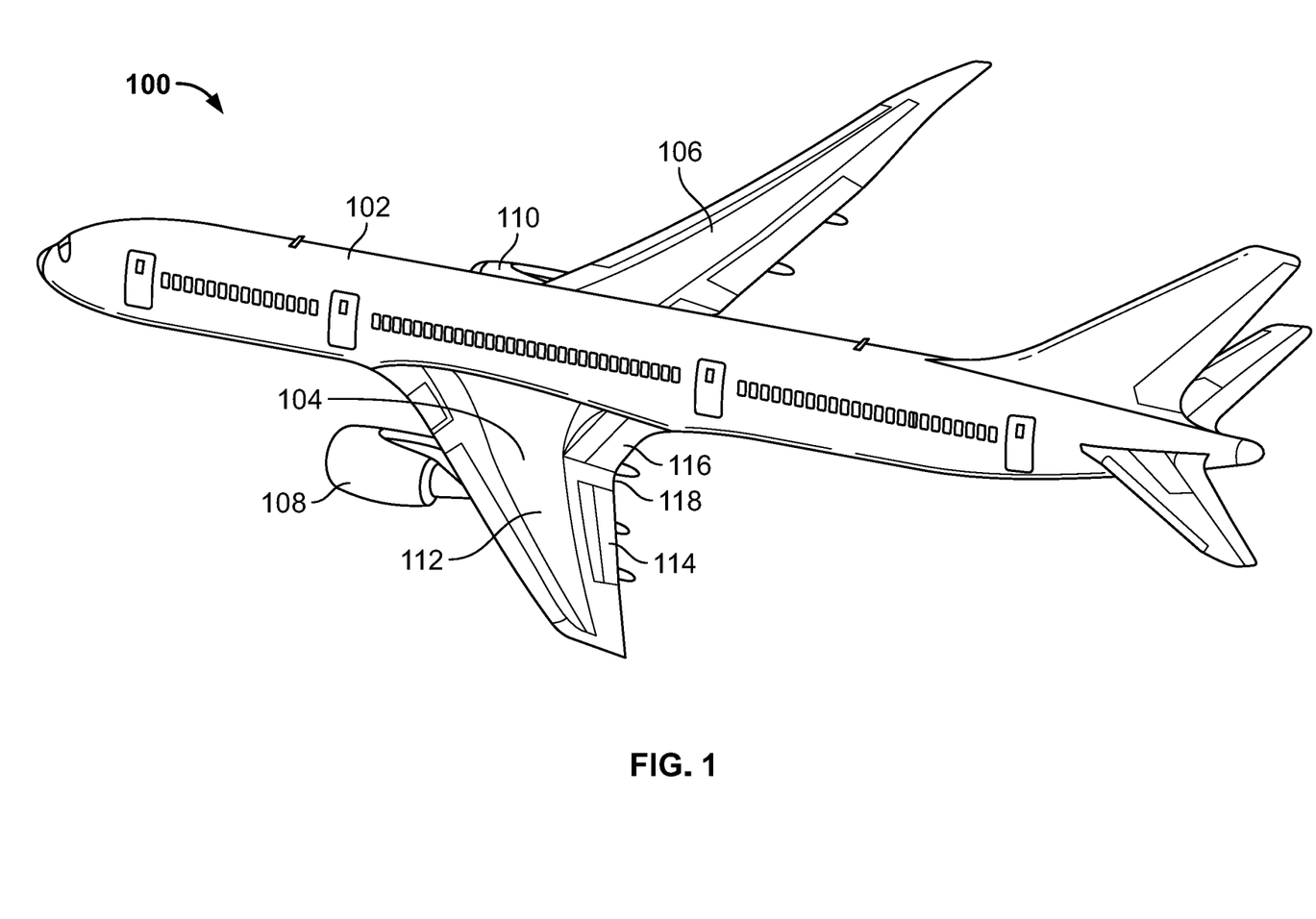
FIG. 1 illustrates an example aircraft in which the examples disclosed herein may be implemented.

FIG. 1 illustrates an example aircraft 100 in which the examples disclosed herein may be implemented. In the illustrated example, the aircraft 100 includes a fuselage 102, a first wing 104 coupled to the fuselage 102, and a second wing 106 coupled to the fuselage 102. The aircraft 100 also includes a first engine 108 carried by the first wing 104 and a second engine 110 carried to the second wing 106. In other examples, the aircraft 100 may have multiple engines coupled to each of the first and second wings 104, 106 and/or disposed in other locations on the aircraft 100 (e.g., coupled to the fuselage 102, coupled to a tail section of the aircraft 100, etc.).

The first and second wings 104, 106 may have one or more control surfaces such as high lift devices that are located along the leading and/or trailing edges of the first and second wings 104, 106. Such high lift devices may be displaced or extended from the leading and/or trailing edges of the first and second wings 104, 106 to change the aerodynamic lift of the aircraft 100 and are typically used during takeoff and landing. For example, in FIG. 1, the first wing 104 has a fixed wing structure or portion 112 and a first flap 114 (an outboard flap) and a second flap 116 (an inboard flap) that are disposed along a trailing edge 118 of the fixed wing portion 112. In other examples, the first wing 104 may include only one flap (e.g., only the first flap 114) or more than two flaps. The first and second flaps 114, 116 are moveably coupled to the fixed wing portion 112. In particular, each of the first and second flaps 114, 116 is moveable between a stowed position (also referred to as a retracted positon), which is shown in FIG. 1, and a deployed position (also referred to as an extended position). In the deployed position, the first and second flaps 114, 116 are moved rearward and downward relative to the trailing edge 118 to change the shape of the first wing 104, which is advantageous during takeoff and landing, for example. Each of the first and second flaps 114, 116 is actuated by one or more flap actuation systems, such as the example flap actuation systems disclosed herein.

Similarly, the second wing 106 may include one or more flaps actuated by one or more flap actuation systems. It is understood that any of the examples disclosed herein in connection with the first wing 104 can likewise be applied to the second wing 106. Thus, to avoid redundancy, a description of the second wing 106 and the flap(s) of the second wing 106 is not provided herein.

Figure 2:
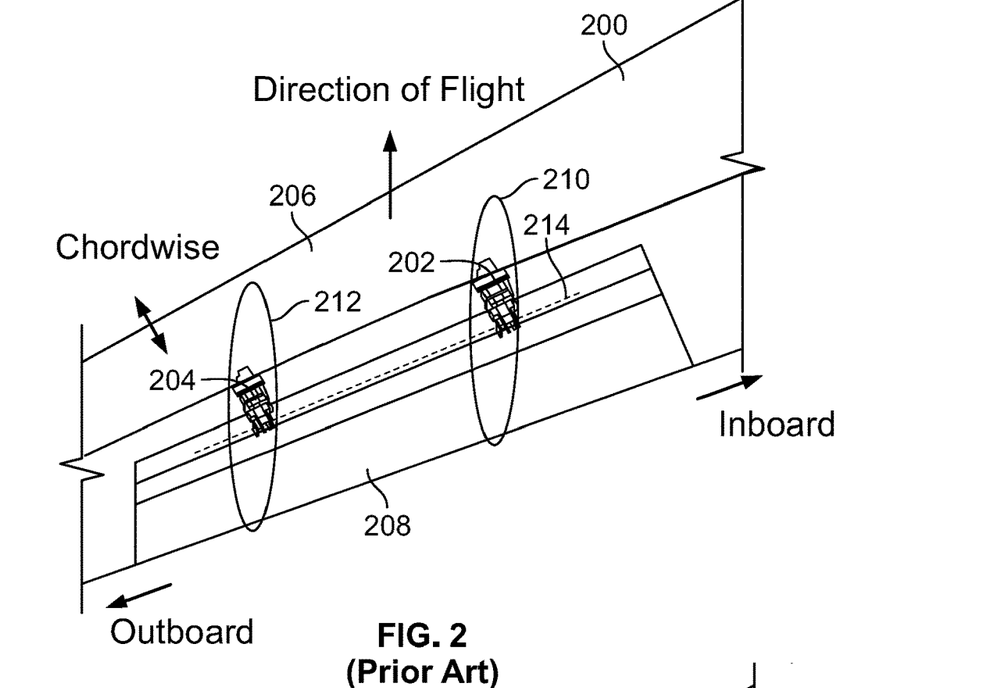
FIG. 2 is a top view of a wing of an aircraft showing a known arrangement of flap actuation systems for moving a flap.

FIG. 2 is a top view of a left wing 200 of a known aircraft showing a known arrangement of two flap actuation systems 202, 204. The wing 200 is a swept wing, so a portion of the wing 200 is angled relative to the direction of flight. The wing 200 has a fixed wing portion 206 and a flap 208 that is movably coupled to the fixed wing portion 206 via the flap actuation systems 202, 204. The fixed wing portion 206 and the flap 208 are shown as transparent to expose the flap actuation systems 202, 204 and flap actuation fairings 210, 212 for the respective flap actuation system 202, 204. The flap 208 is in the stowed position in FIG. 2. The flap actuation systems 202, 204 may be activated to move the flap 208 rearward and downward relative to the fixed wing portion 206 to a deployed position, and activated to move the flap 208 back to the stowed position. Each of the flap actuation systems 202, 204 has an assembly of links that extend in the chordwise direction or otherwise perpendicular to the trailing edge of the wing 200 to move the flap 208 from the stowed position to the deployed position. All of the movement in along the same plane.

As shown in FIG. 2, the flap actuation systems 202, 204 are aligned or oriented in the chordwise direction or perpendicular to the trailing edge of the wing, which is angled relative to the direction of flight. The flap actuation systems 202, 204 have a coaxial hingeline 214, shown by the dashed line in FIG. 2. As such, when the flap actuation systems 202, 204 are activated, the flap actuation systems 202, 204 move the flap 208 rearward (in the chordwise direction) and downward from the fixed wing portion 206.

The flap actuation systems 202, 204 are coupled to and project partially downward from a bottom of the wing 200. The flap actuation fairings 210, 212 are coupled to the bottom of the wing 200 and cover the respective flap actuation systems 202, 204. The flap actuation fairings 210, 212 are oriented streamwise, which corresponds to the direction of flight. However, because the flap actuation systems 202, 204 are angled within the flap actuation fairings 210, 212, the flap actuation fairings 210, 212 need to be designed wider. This adds weight to the aircraft and reduces the high speed performance of the aircraft.

Figure 3:
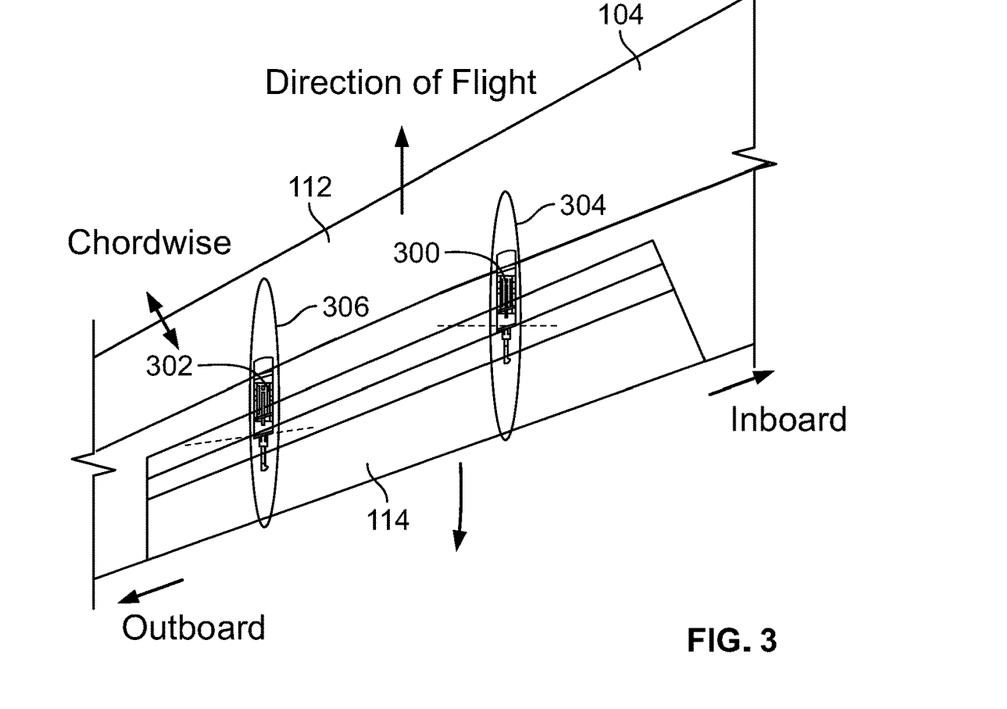
FIG. 3 is a top view of a wing of the aircraft of FIG. 1 showing an arrangement of two example flap actuation systems constructed in accordance with the teachings of this disclosure.

FIG. 3 is a top view of the first wing 104 of the aircraft 100 showing the first flap 114 and two example flap actuation systems 300, 302 (referred to as a first flap actuation system 300 and a second flap actuation system 302) constructed in accordance with the teachings of this disclosure. The example flap actuation systems 300, 302 may also be referred to as flap actuation mechanisms, flap actuation devices, dropped hinge flap mechanisms, or flap supports. The fixed wing portion 112 and the first flap 114 are shown as transparent in FIG. 3 to expose the first and second flap actuation systems 300, 302 and example flap actuation fairings 304, 306 for the respective flap actuation systems 300, 302. The flap actuation fairings 304, 306, which are oriented streamwise, are coupled to the bottom of the first wing 104 and cover at least a portion of the respective first and second flap actuation systems 300, 302. In FIG. 3, the first flap 114 is in the stowed position. The first and second flap actuation systems 300, 302 can be activated to move the first flap 114 rearward and downward relative to the fixed wing portion 112 to the deployed position.

As shown in FIG. 3, the first and second flap actuation systems 300, 302 are aligned or oriented generally streamwise (e.g., 5°). The streamwise orientation corresponds to the direction of flight. As a result, the flap actuation fairings 304, 306 can be sized narrower than the flap actuation fairings 210, 212 shown in FIG. 2. Thus, the example flap actuation systems 300, 302 enable smaller fairings. The example flap actuation systems 300, 302 also have less total wetted area, which results in reduced profile drag, wave drag, and excrescence drag compared to known actuation systems. This results in improved aerodynamic effects and high speed performance of the aircraft 100. Further, the example actuation systems 300, 302 are lighter than known actuation systems and, thus, improve fuel efficiency.

As disclosed above, the first and second flap actuation systems 300, 302 are oriented generally streamwise. Therefore, when the first and second flap actuation systems 300, 302 are activated, the first and second flap actuation systems 300, 302 move the first flap 114 in the streamwise direction from the fixed wing portion 112. The joint hingelines of the first and second flap actuation systems 300, 302 are shown by the dashed lines in FIG. 3. As can be seen from FIG. 3, because the first wing 104 is swept, and because the first and second flap actuation systems 300, 302 are oriented generally streamwise, the joint hingelines are not coaxial. Further, the joint hingelines are not parallel. As a result of the non-parallel and non-coaxial configuration, when the first and second flap actuation systems 300, 302 are simultaneously activated, the first flap 114 not only moves streamwise, but the first flap 114 also moves spanwise in the outboard direction, as shown by the arrow 308. This streamwise and spanwise movement results in a complex motion referred to as conical motion. As disclosed in further detail herein, the first and second flap actuation systems 300, 302 include a structural feature that allows this out-of-plane plane movement or pivoting as the first and second flap actuation systems 300, 302 are deployed.

Although the example flap actuation systems 300, 302 are shown as being oriented streamwise on the first wing 104, the flap actuation systems 300, 302 can instead be oriented chordwise and used for a dropped hinge configuration, similar to the known flap actuation systems 202, 204 in FIG. 2. In such an example, the flap actuation systems 300, 302 move the first flap 114 in the chordwise direction or perpendicular to the trailing to edge of the wing.

Further, while in the illustrated example two flap actuation systems 300, 302 are shown, in other examples, only one flap actuation system may be implemented in connection with the first flap 114. In other examples, more than two flap actuation systems may be implemented in connection with the first flap 114. The second flap 116 (FIG. 1) may similarly be actuated using one or more of the example flap actuation systems.

Figure 4:
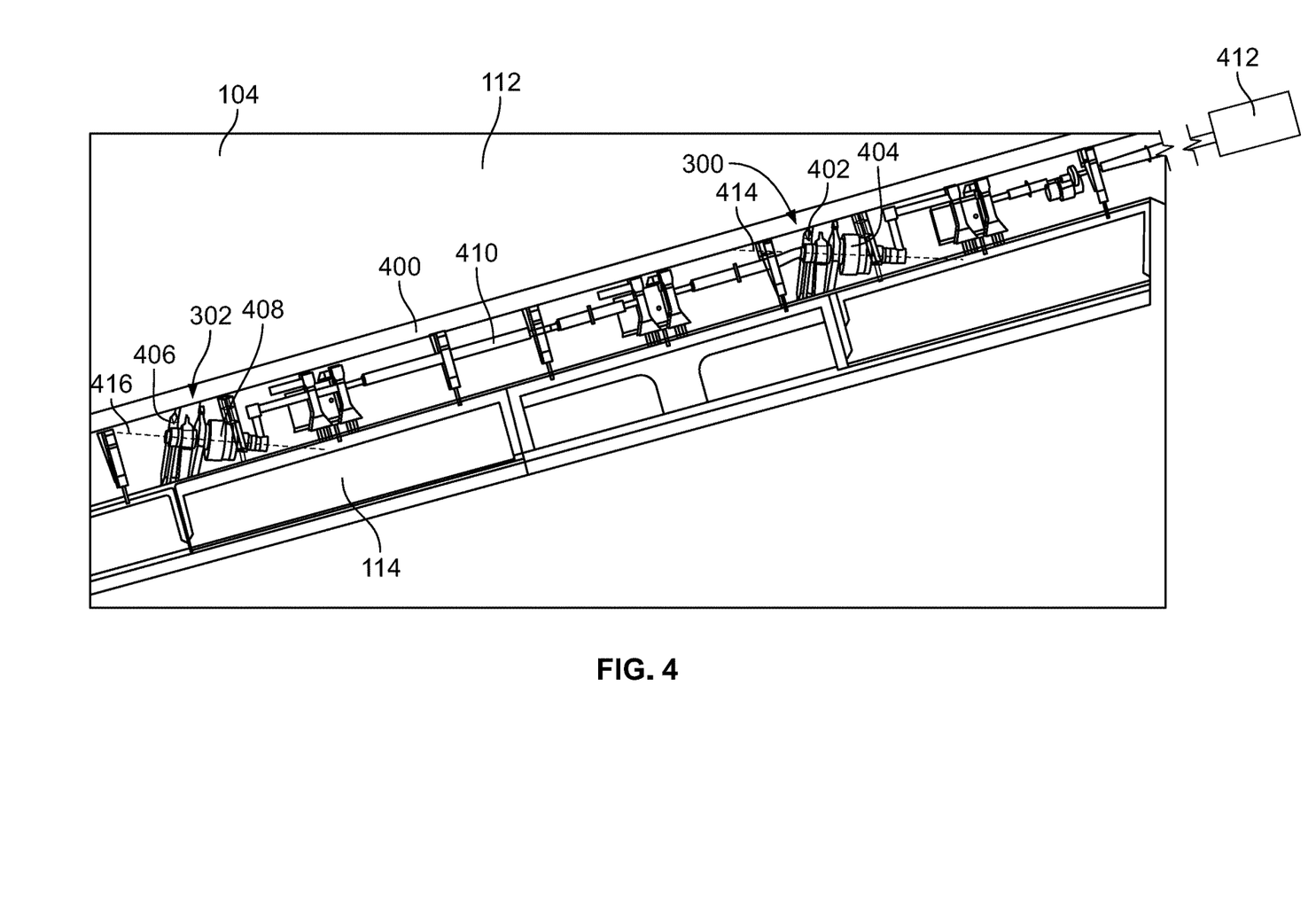
FIG. 4 is a top view of the wing of the aircraft of FIG. 3 showing a series of torque tubes for actuating the example flap actuations systems.

FIG. 4 is a top view of the first wing 104 showing the first and second flap actuation systems 300, 302. A portion of the top panel or skin of the first wing 104 has been removed to expose the first and second flap actuation systems 300, 302. The first and second flap actuation systems 300, 302 are coupled to a structural member in the fixed wing portion 112 of the first wing 104. In this example, the first and second flap actuation system 300, 302 are coupled to a rear spar 400 of the fixed wing portion 112. In other examples, the first and second flap actuation systems 300, 302 can be coupled to another structural member in the fixed wing portion 112.

In the illustrated example, the first flap actuation system 300 includes a fixed beam 402 that is coupled to the rear spar 400. The fixed beam 402 is shown as two parallel beams but can also be formed by a single beam. The first flap actuation system 300 also includes a first geared rotary actuator (GRA) 404. In the illustrated example, the first GRA 404 is coupled to the fixed beam 402. The first GRA 404 is operatively coupled to the first flap 114 via one or more members that form a linkage assembly, an example of which is shown in further detail in connection with FIGS. 5-7. When the first GRA 404 is activated in one direction, the first GRA 404 moves the first flap 114 (via the linkage assembly) from the stowed position to the deployed position, and when the first GRA 404 is activated in the opposite direction, the first GRA 404 moves the first flap 114 (via the linkage assembly) from the deployed position to the stowed position. The second flap actuation system 302 is the substantially the same as the first flap actuation system 300 and similarly includes a fixed beam 406 and a second GRA 408.

In some examples, the first and second GRAs 404, 408 are simultaneously activated via a series of torque tubes 410 (one of which is referenced in FIG. 4). Each of the first and second GRAs 404, 408 has an upstream or input shaft and a downstream or output shaft. One or more torque tubes 410 are coupled between the respective input and output shafts of the first and second GRAs 404, 408. The torque tubes 410 and the first and second GRAs 404, 408 may be coupled at various connection points or joints, such as universal joints (U-joints). One or more torque tubes may be disposed upstream and/or downstream of the first and second GRAs 404, 408 and connected to other GRAs for other flaps.

In some examples, the aircraft 100 includes a motor 412 (sometimes referred to as a power drive unit (PDU)). The motor 412 may be located near the root of the first wing 104. The motor 412 rotates a first one of the torque tubes 410 in the series of torque tubes 410, thereby rotating the entire chain of torque tubes 410 and activating all of the GRAs. As a result, the first and second GRAs 404, 408 deploy the first flap 114 in unison, and any other upstream or downstream flaps may be simultaneously deployed. Each of the first and second GRAs 404, 408 drives a crank arm, which operates the respective linkage assembly, an example of which is shown in farther detail in connection with FIGS. 5-7. In other examples, each of the flap actuation systems may be independently activated (e.g., each flap actuation system includes an actuator that can be activated independent of the other flap actuation systems).

Figure 5:
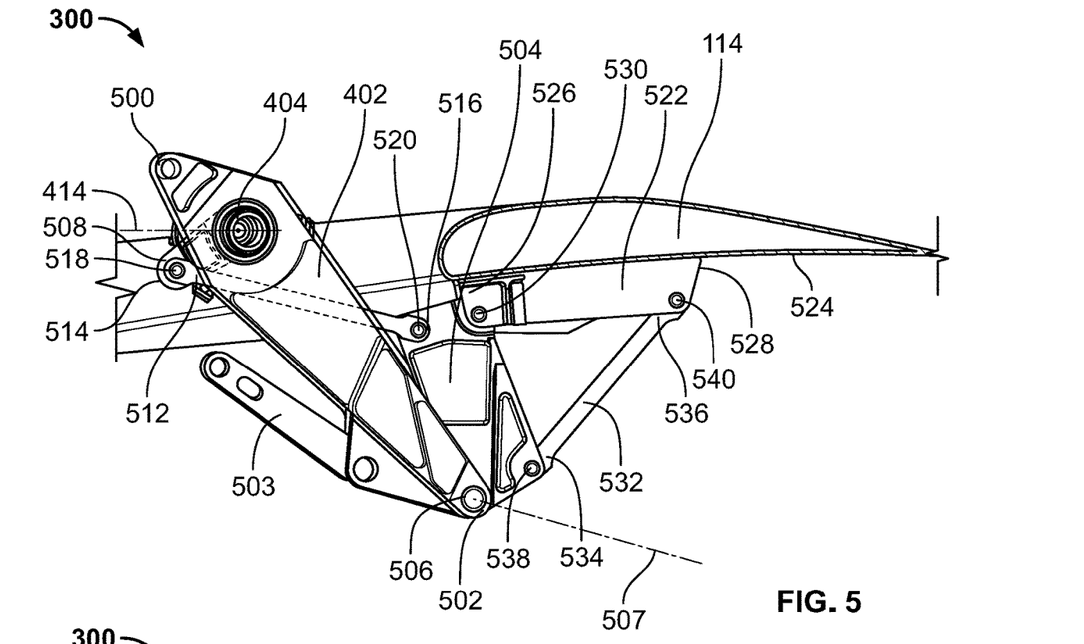
FIG. 5 is a side view of one of the example flap actuation systems of FIGS. 3 and 4 and an example flap in a stowed position.

As shown in FIG. 4, the first GRA 404 of the first actuation system 300 is aligned along a first axis 414 (i.e., the axis of the input/output shafts of the first GRA 404), which defines an actuation hingeline for the first actuation system 300. The second GRA 408 of the second actuation system 304 is aligned along a second axis 416 (i.e., the axis of the input/output shafts of the second GRA 408), which defines an actuation hingeline for the second flap actuation system 302. The first and second axes 414, 416 are offset from each other (i.e., non-coaxial) and non-parallel to each other. Further, the first and second flap actuation systems 300, 302 have flap hingelines, an example of which is shown in FIG. 5. The flap hingelines are offset from each other (i.e., non-coaxial) and non-parallel to each other. In some examples, the first and second flap actuation systems 300, 302 may be similarly structured but have different actuation lengths and/or actuation speeds (e.g., depending on a desired motivation, such as load optimization, integration, flap timing, etc.). This arrangement results in the complex motion of the first flap 114 as the first flap 114 is deployed.

FIG. 5 is a side view of the first example flap actuation system 300 with the first flap 114 in the stowed position. The fixed wing portion 112 and other parts of the first wing 104 have been removed for clarity. As disclosed above, the second flap actuation system 302 (FIGS. 3 and 4) is substantially the same as the first flap actuation system 300. Therefore, any of the disclosure herein relating to the first flap actuation system 300 can likewise apply to the second flap actuation system 302.

As described above, the first flap actuation system 300 includes the fixed beam 402. The fixed beam 402 is coupled to and extends downward from the fixed wing portion 112 of the first wing 104 (FIGS. 1 and 4). The fixed beam 402 has a first end 500 (a forward end) and a second end 502 (an aft end) opposite the first end 500. The first end 500 of the fixed beam 402 is coupled to the rear spar 400 shown in FIG. 4. The fixed beam 402 is fixed and remains stationary throughout movement of the first flap 114. In some examples, a support beam 503 is coupled between the fixed beam 402 and the fixed wing portion 112 to help support and stabilize the fixed beam 402.

In the illustrated example, the first flap actuation system 300 includes a rocking lever plate 504 (which may also be referred to as a rocker). The rocking lever plate 504 is pivotably coupled to the fixed beam 402 at or near the second end 502 of the fixed beam 402. Therefore, the rocking lever plate 504 can be pivoted or rotated relative to the fixed beam 402. In the illustrated example, the rocking lever plate 504 is pivotably coupled to the fixed beam 402 via a joint or coupling 506. In this example, the coupling 506 is a one degree-of-freedom (DOF) joint that allows pivoting motion along one axis. As such, the rocking lever plate 504 remains within or moves along the same plane during movement. The coupling 506 may be, for example, a pin or journal bearing. The coupling 506 forms an axis referred to as a flap hingeline 507. The second flap actuation system has a similar flap hingeline. As disclosed above, the flap hingeline 507 of the first flap actuation system 300 is offset from (e.g., not co-axial) and non-parallel to the flap hingeline of the second flap actuation system 302.

In the illustrated example, the first GRA 404 is coupled to the fixed beam 402 near the first end 500 of the fixed beam 402. In the illustrated example, the first flap actuation system 300 includes a crank arm 508 that is coupled to and driven by the first GRA 404. In particular, when the first GRA 404 is activated, the first GRA 404 drives or rotates the crank arm 508 about the first axis 414.

In the illustrated example, the first flap actuation system 300 includes a crank rod 512 coupled between the crank arm 508 and the rocking lever plate 504. The crank rod 512 has a first end 514 (a forward end) and a second end 516 (an aft end) opposite the first end 514. The first end 514 of the crank rod 512 is pivotably coupled to the crank arm 508 via a joint or coupling 518, and the second end 516 of the crank rod 512 is pivotably coupled to the rocking lever plate 504 via a joint or coupling 520. The couplings 518, 520 may be one DOF joints (e.g., a pin, a journal bearing) or two DOF joints (e.g., a ball joint, a spherical bearing, etc.). In some examples, the couplings 518, 520 are implemented as two DOF joints to aid with the build process and deflections that may happen during flight. The coupling 520 is spaced apart from the coupling 506. As such, when the first GRA 404 is actuated, the crank arm 508 is rotated, which moves the crank rod 512, which pivots or rocks the rocking lever plate 504 about the coupling 506.

In the illustrated example, the first flap actuation system 300 includes a flap bracket 522 (e.g., a support, a mount, etc.) that is disposed on a bottom side 524 of the first flap 114. The flap bracket 522 has a first end 526 (a forward end) and a second end 528 (an aft end) opposite the first end 526. In the illustrated example, the rocking lever plate 504 is coupled to the first end 526 of the flap bracket 522 via a joint or coupling 530. In this example, the coupling 530 is a two DOF joint, which allows pivoting or rotation about more than one axis. The coupling 520 may be, for example, a ball joint or a spherical bearing.

In the illustrated example, the first flap actuation system 300 includes a flap link 532. The flap link 532 is coupled between the rocking lever plate 504 and the second end 528 of the flap bracket 522. The flap link 532 has a first end 534 (a forward end) and a second end 536 (an aft end) opposite the first end 534. The first end 534 of the flap link 532 is coupled to the rocking lever plate 504 via a joint or coupling 538. The coupling 538 is a two DOF joint that allows pivoting or rotation about more than one axis. The coupling 538 may be, for example, a ball joint or a spherical bearing. Similarly, the second end 536 of the flap link 532 is coupled to the second end 528 of the flap bracket 522 via a joint or coupling 540. The coupling 540 is two DOF joint that allows pivoting or rotation about more than one axis. The coupling 540 may be, for example, a ball joint or a spherical bearing. While in this example the rocking lever plate 504 and the flap link 532 are coupled to opposite ends of the flap bracket 522, in other examples, the flap bracket 522 may be divided or separated into two separate brackets (e.g., a forward bracket and an aft bracket).

As can be seen from FIG. 5, the rocking lever plate 504, the flap bracket 522, and the flap link 532 form a triangle. As the rocking lever plate 504 is pivoted or rotated about the coupling 506, the triangle also rotates, which moves the first flap 114 between the stowed and deployed positions. Therefore, actuation of the crank arm 508 pivots the rocking lever plate 504 to move the first flap 114 between the stowed position and the deployed position relative to the fixed wing portion 112 (FIG. 4). The fixed beam 402, the rocking lever plate 504, the crank arm 508, the crank arm 512, the flap bracket 522, and the flap link 532 form the linkage assembly that, when driven by the first GRA 404, operates to move the first flap 114 between the stowed position and the deployed position. The first flap actuation system 300 has fewer components and is less complex than known flap actuation systems. The arrangement of the components of the first flap actuation system 300 also results in a smaller, more compact system.

As described above, the coupling 506 and the coupling 520 are one DOF joints that only allow pivoting motion about one axis. As such, the rocking lever plate 504 can only move in or along a fixed plane. However, the couplings 530, 538, 540 are two DOF joints that allow pivoting about multiple axes. For example, the couplings 530, 538, 540 may be implemented by ball joints or spherical bearings. Therefore, the flap bracket 522 and the flap link 532 are pivotable out-of-plane relative to the rocking lever plate 504 (e.g., into or out of the figure). This enables the second ends 528, 536 of the flap bracket 522 and the flap link 532 to move out-of-the plane of the rocking lever plate 504 or spanwise when the first flap 114 is moved between the stowed position and the deployed position. For example, the coupling 540 (where the flap bracket 522 and the flap link 532 are coupled), may move 1-1.5 inches out-of-plane. This enables the first flap 114 to undergo the conical motion as the first flap 114 is moved between the stowed position and the deployed position. Not only does the first flap 114 move rearward and downward when deployed, but the first flap 114 translates spanwise (e.g., outboard).

Figure 6:
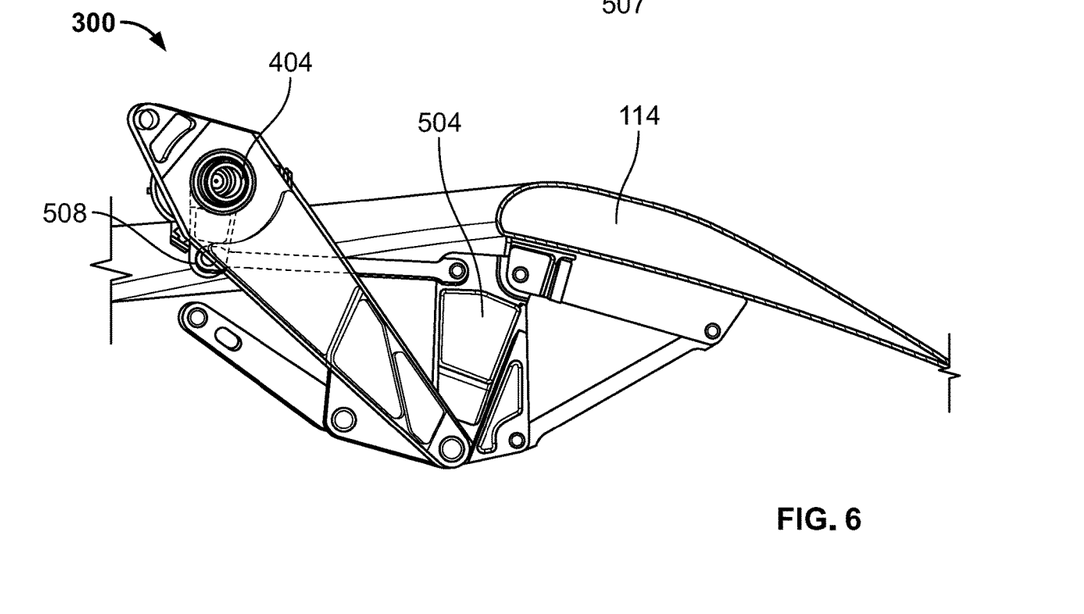
FIG. 6 shows the example flap actuation system and flap of FIG. 5 in a partially deployed position.
Figure 7:
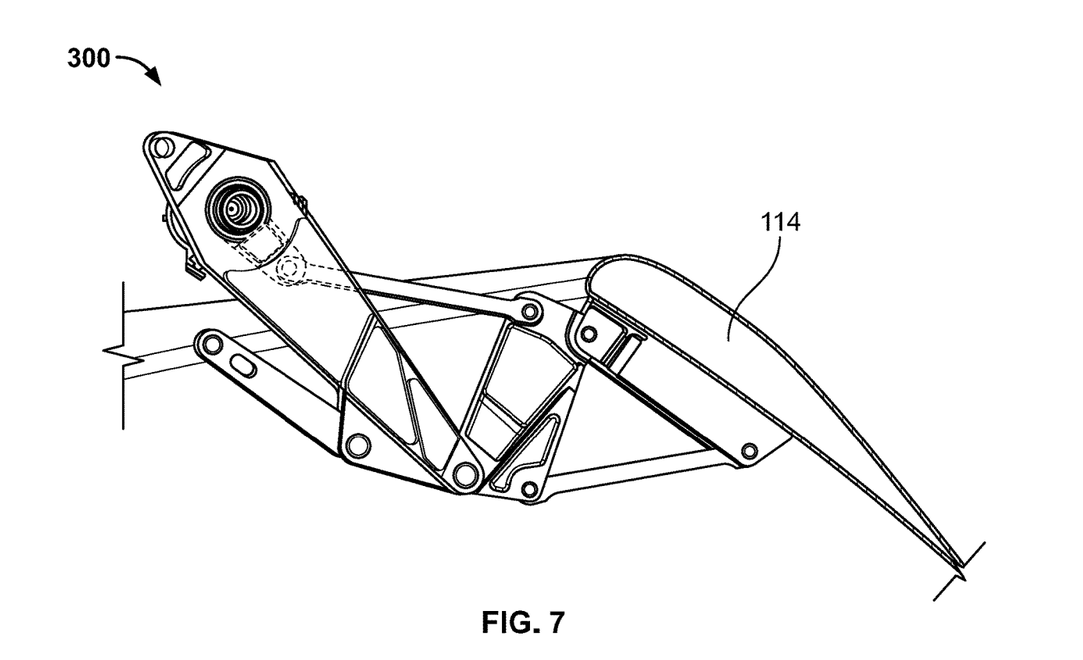
FIG. 7 shows the example flap actuation system and flap of FIG. 5 in the deployed position.

FIG. 6 shows the position of the first flap actuation system 300 and the first flap 114 as the first GRA 404 is activated to move the first flap 114 to the deployed position. In FIG. 6, the first flap 114 is between the stowed position (FIG. 5) and the deployed position (FIG. 7). The first GRA 404 has rotated the crank arm 508, which pivots the rocking lever plate 504. This causes the flap bracket 522 (and, thus, the first flap 114) to move rearward tilt downward.

FIG. 7 shows the position of the first flap actuation system 300 and the first flap 114 in the deployed position. The first flap 114 has moved rearward and downward, and has also shifted spanwise (into or out of the page).

In the example of FIGS. 5-7, the coupling 520 (where the crank arm 512 and the rocking lever plate 504 are coupled) is a predetermined distance from the coupling 506 (where the rocking lever plate 504 pivots on the fixed beam 402). The crank arm 512 has an arm length that is not less than a predetermined fraction of the predetermined distance. This provides a mechanical advantage with respect to actuator load (of the first GRA 404) relative to linear force applied via the crank rod 512 to move the first flap 114.

Figure 8A:
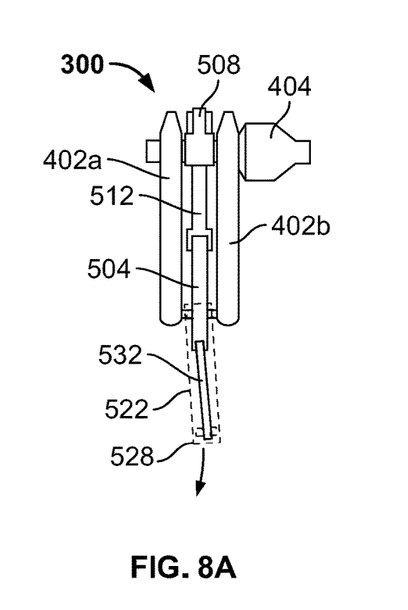
FIG. 8A is a top view of the example flap actuation system of FIG. 5 in the stowed position.
Figure 8B:
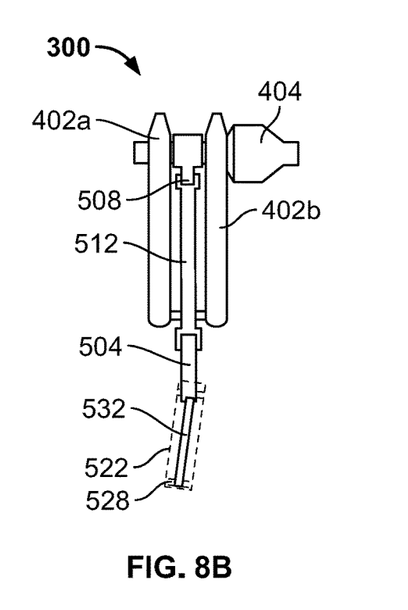
FIG. 8B is a top view of the example flap actuation system of FIG. 7 in the deployed position.

FIG. 8A is a top view of the flap actuation system 300 in the stowed position (corresponding to FIG. 5), and FIG. 8B is a top view of the flap actuation system 300 in the deployed position (corresponding to FIG. 7). In this example, the fixed beam 402 is divided into two parallel beams 402a, 402b. However, in other examples, the fixed beam 402 may be implemented as only a single beam. Also shown in FIGS. 8A and 8B are the first GRA 404, the rocking lever plate 504, the crank arm 508, the crank rod 512, the flap bracket 522, and the flap link 532. The flap bracket 522 is shown in dotted lines. The fixed beam 402, the rocking lever plate 504, the flap bracket 522, and the flap link 532 are oriented generally streamwise (e.g., 5°).

As shown in FIGS. 8A and 8B, the rocking lever plate 504 remains within the same plane throughout its movement (up and down in FIGS. 8A and 8B). The couplings 530, 538, 540 (FIG. 5), which are two DOF joints, enable the flap bracket 522 and the flap link 532 to pivot out-of-plane relative to the rocking lever plate 504. As such, not only does the second end 528 of the flap bracket 522 moved aft/rearward in the steamwise direction, but the second end 528 of the flap bracket 522 moves spanwise (to the left in FIG. 8B) relative to the first end 526 of the flap bracket 522. In this example, in the stowed position of FIG. 8A, the flap bracket 522 is angled slightly inboard (to the right). As the first flap actuation system 300 is deployed, the flap bracket 522 (and, thus, the first flap 114) moves outboard. About midway through the movement the flap bracket 522 is centered or aligned with the rocking lever plate 504. This helps distribute the load across the two DOF joints (e.g., the ball bearings) during the movement so that the two DOF joints do not experience load on only one side. The path of movement is shown by the arrow in FIG. 8A. This complex motion may be referred to as conical motion. This motion enables the first flap 114 to move rearward and slide spanwise (e.g., outboard).

Figure 9:
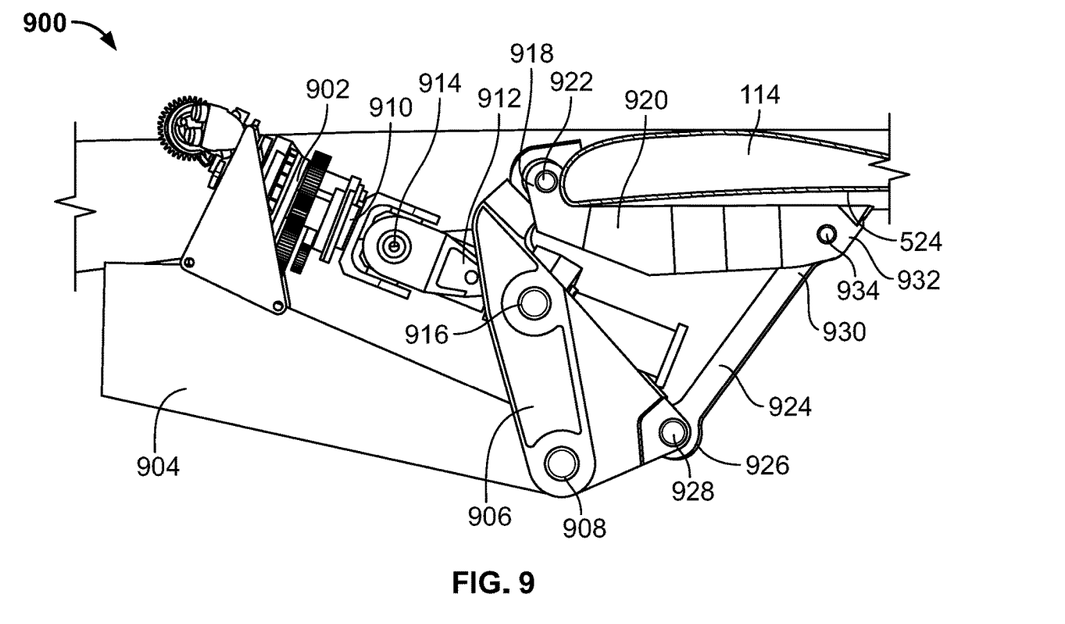
FIG. 9 is a side view of an example flap actuation system that utilizes a linear actuator.

While in the example of FIGS. 4-7 the first flap actuation system 300 utilizes a rotary actuator (the first GRA 404), in other examples, another type of actuator such as a linear actuator may be used. For example, FIG. 9 illustrates an example flap actuation system 900 that includes a linear actuator 902 instead of a rotary actuator. In this example, the linear actuator 902 is a ball screw actuator. In other examples, other types of linear actuators could be used. The linear actuator 902 can be mechanical, hydraulically, or electrically actuated. The flap actuation system 900 includes a linkage assembly that is similar to the linkage assembly of the first flap actuation system 300 disclosed above. The flap actuation system 900 may be implemented in the aircraft 100 of FIG. 1 and oriented generally streamwise, similar to the flap actuation systems 300, 302 disclosed above. The flap actuation system 900 is described in connection with the first flap 114. In FIG. 9, the flap actuation system 900 and the first flap 114 are in the stowed position.

In the illustrated example, the flap actuation system 900 includes a fixed beam 904 that is fixedly coupled to a structure in the fixed wing portion 112 of the first wing 104 (FIG. 1), such as the rear spar 400 (FIG. 4). The flap actuation system 900 includes a rocking lever plate 906 that is pivotably coupled to the fixed beam 904 via a joint or coupling 908, which is a one DOF joint. The coupling 908 may be, for example, a pin or a journal bearing.

In the illustrated example, the linear actuator 902 is coupled to the fixed beam 904. The linear actuator 902 has a shaft 910 that is driven linearly when the actuator 902 is activated. The flap actuation system 900 includes a connecting arm 912 coupled between the shaft 910 and the rocking lever plate 906. The connecting arm 912 is coupled to the shaft 910 via a joint or coupling 914, which, in this example, is a U-joint. The connecting arm 912 is pivotably coupled to the rocking lever plate 906 via a joint or coupling 916. When the linear actuator 902 is activated, the shaft 910 is moved linearly, which moves the connecting arm 912, which pivots or rocks the rocking lever plate 906 about the coupling 908.

In the illustrated example, the rocking lever plate 906 is coupled to a first end 918 of a flap bracket 920 that is disposed on the bottom side 524 of the first flap 114. The rocking lever plate 906 is coupled to the flap bracket 920 via a joint or coupling 922. The flap actuation system 900 also includes a flap link 924 that is coupled between the rocking lever plate 906 and the flap bracket 920. A first end 926 of the flap link 924 is coupled to the rocking lever plate 906 via a joint or coupling 928, and a second end 930 of the flap link 924 is coupled to a second end 932 of the flap bracket 920 via a joint or link coupling 934. The fixed beam 904, the rocking lever plate 906, the connecting arm 912, the flap bracket 920, and the flap link 924 form the linkage assembly that, when driven by the linear actuator 902, operates to move the first flap 114 between the stowed position and the deployed position. The flap actuation system 900 results in the same conical motion of the first flap 114 as the flap actuation system 300 disclosed above. Similar to the first flap actuation system 300 disclosed above, the coupling 908 is a one DOF coupling, and the couplings 922, 928, 934 are two DOF couplings (e.g., ball joints, spherical bearings, etc.). This enables the second end 932 of the flap bracket 920 (and, thus, the first flap 114) to swing spanwise when the first flap 114 is deployed.

Figure 10:
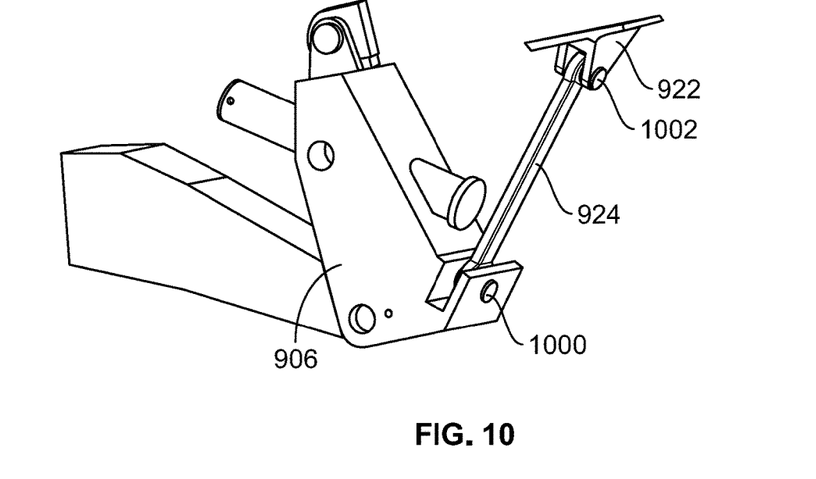
FIG. 10 is a perspective view of a portion of the flap actuation system of FIG. 9 showing an alternative arrangement of couplings that may be implemented.

FIG. 10 shows a variation of the flap actuation system 900 of FIG. 9 with an alternative arrangement of the couplings that may be implemented. In the illustrated example, the rocking lever plate 906 and the flap link 924 are coupled via a joint or coupling 1000. In this example, the coupling 1000 is a one DOF joint (e.g., a pin, a journal bearing, etc.) that is orientated along an axis that is perpendicular to the axis of the coupling 928 in FIG. 9. A coupling 1002 between the flap link 924 and the flap bracket 920 is a two DOF joint that is orientated along an axis that is perpendicular to the axis of the coupling 934 in FIG. 9. The couplings 1000, 1002 enable the flap link 924 to swing out-of-plane relative to the rocking lever plate 906. The linkage assembly shown in FIG. 10 results in substantially the same conical motion of the first flap 114. While in the examples above the actuators of the flap actuation systems 300, 302, 900 are implemented as mechanical actuators, in other examples, the actuators can be implemented as hydraulically and/or electrically powered.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example systems/apparatus and articles of manufacture have been disclosed that enable flap actuation systems to be oriented generally streamwise, which enables the use of smaller, lighter flap actuation fairings. These smaller, lighter flap actuation fairings reduce weight of the aircraft. Further, the example flap actuation assemblies disclosed herein have less total wetted area, which reduces profile drag, wave drag, and excrescence drag, thereby improving high speed performance of the aircraft. Example flap actuation systems disclosed herein include unique linkage assemblies that have fewer components and are less complex than known flap actuation systems. As such, the example flap actuation systems disclosed herein are smaller, lighter, and less expensive to manufacture and assemble. The example flap actuation systems disclosed herein may also be used in connection with any types of flaps, such as Fowler flaps, double-slotted Fowler flaps, etc. The example flap actuation systems are capable of high and low Fowler flap motion.

The following paragraphs provide various examples of the examples disclosed herein.

Example 1 includes a flap actuation system comprising a fixed beam coupled to and extending downward from a fixed wing portion of a wing of an aircraft and a rocking lever plate pivotably coupled to the fixed beam via a first coupling. The rocking lever plate is coupled to a forward end of a flap bracket disposed on a bottom side of a flap of the wing.

The flap actuation system of Example 1 further includes a crank arm, a crank rod coupled between the crank arm and the rocking lever plate, the crank rod coupled to the rocking lever plate via a second coupling that is spaced apart from the first coupling, and a flap link coupled between the rocking lever plate and an aft end of the flap bracket, such that actuation of the crank arm pivots the rocking lever plate to move the flap between a stowed position and a deployed position relative to the fixed wing portion.

Example 2 includes the flap actuation system of Example 1, wherein the flap bracket and the flap link are pivotable out-of-plane relative to the rocking lever plate, thereby enabling the flap to undergo a conical motion as the flap is moved between the stowed position and the deployed position.

Example 3 includes the flap actuation system of Example 2, wherein the rocking lever plate and the flap bracket are coupled via a third coupling, the flap link and the rocking lever plate are coupled via a fourth coupling, and the flap link and the flap bracket are coupled via a fifth coupling.

Example 4 includes the flap actuation system of Example 3, wherein the third, fourth, and fifth couplings are two degree-of-freedom (DOF) joints.

Example 5 includes the flap actuation system of Example 4, wherein the third, fourth, and fifth couplings are ball joints or spherical bearings.

Example 6 includes the flap actuation system of Examples 4 or 5, wherein the first coupling is a one DOF joint such that the rocking lever plate remains within a plane during movement.

Example 7 includes the flap actuation system of any of Examples 1-6, wherein an aft end of the flap link moves spanwise when the flap is moved between the stowed position and the deployed position.

Example 8 includes the flap actuation system of any of Examples 1-7, wherein the second coupling is a predetermined distance from the first coupling, and the crank arm has an arm length that is not less than a predetermined fraction of the predetermined distance to provide a mechanical advantage with respect to actuator load relative to linear force applied via the crank rod to move the flap.

Example 9 includes the flap actuation system of any of Examples 1-8, further including a geared rotary actuator (GRA). The crank arm is coupled to and driven by the GRA.

Example 10 includes the flap actuation system of Example 9, wherein the GRA is coupled to the fixed beam.

Example 11 includes an aircraft wing comprising a fixed wing portion, a flap, and a flap actuation system coupled to the fixed wing portion to move the flap relative to the fixed wing portion between a stowed position and a deployed position. The flap actuation system includes a fixed beam coupled to and extending downward from the fixed wing portion and a rocking lever plate pivotably coupled to the fixed beam. The rocking lever plate is coupled to a forward end of a flap bracket disposed on a bottom side of the flap. The rocking lever plate is to be rotated relative to the fixed beam via a rotary actuator. The flap actuation system further includes a flap link coupled between the rocking lever plate and an aft end of the flap bracket. The fixed beam, the rocking lever plate, the flap bracket, and the flap link are oriented generally streamwise.

Example 12 includes the aircraft wing of Example 11, wherein the flap bracket and the flap link are pivotable out-of-plane relative to the rocking lever plate, thereby enabling the flap to undergo a conical motion when the flap is moved between the stowed position and the deployed position.

Example 13 includes the aircraft wing of Example 12, wherein the rocking lever plate and the flap bracket are coupled via a first coupling, the flap link and the rocking lever plate are coupled via a second coupling, and the flap link and the flap bracket are coupled via a third coupling.

Example 14 includes the aircraft wing of Example 13, wherein the first, second, and third couplings are two degree-of-freedom (DOF) joints.

Example 15 includes the aircraft wing of Example 14, wherein the rocking lever plate is coupled to the fixed beam via a one DOF joint such that the rocking lever plate remains within a plane during movement.

Example 16 includes the aircraft wing of any of Examples 11-15, wherein the flap is moved spanwise when the flap is moved between the stowed position and the deployed position.

Example 17 includes the aircraft wing of any of Examples 11-16, further including a flap actuation fairing coupled to the fixed wing portion and covering at least a portion of the flap actuation system. The flap actuation fairing is oriented streamwise.

Example 18 includes the aircraft wing of any of Examples 11-17, wherein the flap actuation system is a first flap actuation system, further including a second flap actuation system. The second flap actuation system is to move the flap between the stowed position and the deployed position.

Example 19 includes the aircraft wing of Example 18, wherein a flap hingeline of the first flap actuation system is offset from and non-parallel to a flap hingeline of the second flap actuation system.

Example 20 includes a flap actuation system comprising a fixed beam coupled to and extending downward from a fixed wing portion of a wing of an aircraft and a rocking lever plate pivotably coupled to the fixed beam via a first coupling. The rocking lever plate is coupled to a forward end of a flap bracket disposed on a bottom side of a flap of the wing. The flap actuation system of Example 20 also includes a linear actuator having an output shaft, a connecting arm coupled between the output shaft and the rocking lever plate, the connecting arm coupled to the rocking lever plate via a second coupling that is spaced apart from the first coupling, and a flap link coupled between the rocking lever plate and an aft end of the flap bracket, such that actuation of the output shaft pivots the rocking lever plate to move the flap between a stowed position and a deployed position relative to the fixed wing portion.

Example 21 includes the flap actuation system of Example 20, wherein the flap bracket and the flap link are pivotable out-of-plane relative to the rocking lever plate, thereby enabling the flap to undergo a conical motion as the flap is moved between the stowed position and the deployed position.

Example 22 includes the flap actuation system of Example 21, wherein the rocking lever plate and the flap bracket are coupled via a third coupling, the flap link and the rocking lever plate are coupled via a fourth coupling, and the flap link and the flap bracket are coupled via a fifth coupling.

Example 23 includes the flap actuation system of Example 22, wherein the third, fourth, and fifth couplings are two degree-of-freedom (DOF) joints.

Example 24 includes the flap actuation system of Example 23, wherein the third, fourth, and fifth couplings are ball joints or spherical bearings.

Example 25 includes the flap actuation system of Examples 23 or 24, wherein the first coupling is a one DOF joint such that the rocking lever plate remains within a plane during movement.

Example 26 includes the flap actuation system of any of Examples 20-25, wherein an aft end of the flap link moves spanwise relative to the rocking lever plate when the flap is moved between the stowed position and the deployed position.

Example 27 includes the flap actuation system of any of Examples 20-26, wherein the linear actuator is coupled to the fixed beam.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A flap actuation system comprising:
a fixed beam coupled to and extending downward from a fixed wing portion of a wing of an aircraft;
a rocking lever plate pivotably coupled to the fixed beam via a first coupling, the first coupling being a one degree-of-freedom (DOF) joint such that the rocking lever plate remains within a plane during movement, the rocking lever plate coupled to a forward end of a flap bracket disposed on a bottom side of a flap of the wing via a second coupling, the second coupling being a two DOF joint to enable the flap bracket to pivot out-of-plane relative to the rocking lever plate;
a crank arm;
a crank rod coupled between the crank arm and the rocking lever plate, the crank rod coupled to the rocking lever plate via a third coupling that is spaced apart from the first coupling; and
a flap link coupled between the rocking lever plate and an aft end of the flap bracket, such that actuation of the crank arm pivots the rocking lever plate to move the flap between a stowed position and a deployed position relative to the fixed wing portion.

2. The flap actuation system of claim 1, wherein the flap bracket and the flap link are pivotable out-of-plane relative to the rocking lever plate, thereby enabling the flap to undergo a conical motion as the flap is moved between the stowed position and the deployed position.

3. The flap actuation system of claim 2, wherein the flap link and the rocking lever plate are coupled via a fourth coupling, and the flap link and the flap bracket are coupled via a fifth coupling.

4. The flap actuation system of claim 3, wherein the fourth and fifth couplings are two degree-of-freedom (DOF) joints.

5. The flap actuation system of claim 4, wherein the second, fourth, fourth, and fifth couplings are ball joints or spherical bearings.

6. The flap actuation system of claim 1, wherein an aft end of the flap link moves spanwise when the flap is moved between the stowed position and the deployed position.

7. The flap actuation system of claim 1, wherein the third coupling is a predetermined distance from the first coupling, and the crank arm has an arm length that is not less than a predetermined fraction of the predetermined distance to provide a mechanical advantage with respect to actuator load relative to linear force applied via the crank rod to move the flap.

8. The flap actuation system of claim 1, further including a geared rotary actuator (GRA), the crank arm coupled to and driven by the GRA.

9. The flap actuation system of claim 8, wherein the GRA is coupled to the fixed beam.

10. An aircraft wing comprising:
a fixed wing portion;
a flap;
a first flap actuation system coupled to the fixed wing portion to move the flap relative to the fixed wing portion between a stowed position and a deployed position, the first flap actuation system including:
a first fixed beam coupled to and extending downward from the fixed wing portion;
a first rocking lever plate pivotably coupled to the first fixed beam via a first coupling, the first coupling forming a first hingeline, the first rocking lever plate coupled to a forward end of a flap bracket disposed on a bottom side of the flap, the first rocking lever plate to be rotated relative to the first fixed beam via a rotary actuator; and
a flap link coupled between the first rocking lever plate and an aft end of the flap bracket, the first fixed beam, the first rocking lever plate, the flap bracket, and the flap link oriented generally streamwise; and
a second flap actuation system to move the flap between the stowed position and the deployed position, the second flap actuation system including:
a second fixed beam coupled to an extending downward from the fixed wing portion; and
a second rocking lever plate pivotably coupled to the second fixed beam via a second coupling, the second coupling forming a second hingeline, wherein the second hingeline is offset from and non-parallel to the first hingeline.

11. The aircraft wing of claim 10, wherein the flap bracket and the flap link are pivotable out-of-plane relative to the first rocking lever plate, thereby enabling the flap to undergo a conical motion when the flap is moved between the stowed position and the deployed position.

12. The aircraft wing of claim 11, wherein the first rocking lever plate and the flap bracket are coupled via a third coupling, the flap link and the first rocking lever plate are coupled via a fourth coupling, and the flap link and the flap bracket are coupled via a fifth coupling.

13. The aircraft wing of claim 12, wherein the third, fourth, and fifth couplings are two degree-of-freedom (DOF) joints.

14. The aircraft wing of claim 13, wherein the first coupling is a one DOF joint such that the first rocking lever plate remains within a plane during movement.

15. The aircraft wing of claim 10, wherein the flap is moved spanwise when the flap is moved between the stowed position and the deployed position.

16. The aircraft wing of claim 10, further including a flap actuation fairing coupled to the fixed wing portion and covering at least a portion of the first flap actuation system, the flap actuation fairing oriented streamwise.

17. A flap actuation system comprising:
a fixed beam coupled to and extending downward from a fixed wing portion of a wing of an aircraft;
a rocking lever plate pivotably coupled to the fixed beam via a first coupling, the rocking lever plate coupled to a forward end of a flap bracket disposed on a bottom side of a flap of the wing;
a linear actuator having an output shaft;

a connecting arm coupled between the output shaft and the rocking lever plate, the connecting arm coupled to the rocking lever plate via a second coupling that is spaced apart from the first coupling; and a flap link coupled between the rocking lever plate and an aft end of the flap bracket, such that actuation of the output shaft pivots the rocking lever plate to move the flap between a stowed position and a deployed position relative to the fixed wing portion, wherein the flap link and the rocking lever plate are coupled via a third coupling, the flap link and the flap bracket are coupled via a fourth coupling, and the third and fourth couplings form rotational axes that are oriented in a direction that is perpendicular to a direction of rotational axes of the first and second couplings.

18. The flap actuation system of claim 17, wherein the third coupling is a one degree-of-freedom (DOF) joint.

19. The flap actuation system of claim 17, wherein the connecting arm is coupled to the output shaft via a u-joint.

20. The flap actuation system of claim 17, wherein the linear actuator is a ball screw actuator.

* * * * *

UNITED STATES PATENT AND TRADEMARK OFFICE
CERTIFICATE OF CORRECTION

| | | |
|---|---|---|
| PATENT NO. | : 11,518,496 B2 | |
| APPLICATION NO. | : 16/552466 | |
| DATED | : December 6, 2022 | |
| INVENTOR(S) | : Dahl et al. | |

It is certified that error appears in the above-identified patent and that said Letters Patent is hereby corrected as shown below:

In the Claims

Column 15, Line 56 (Claim 5): delete "fourth,"

Signed and Sealed this
Seventh Day of March, 2023

Katherine Kelly Vidal
*Director of the United States Patent and Trademark Office*